(12) United States Patent
Stephens et al.

(10) Patent No.: US 11,617,403 B2
(45) Date of Patent: Apr. 4, 2023

(54) FACE SHIELD MANUFACTURING METHOD AND ASSEMBLY

(71) Applicant: Ford Global Technologies, LLC, Dearborn, MI (US)

(72) Inventors: Paul Stephens, Oxford, MI (US); Stephen Hung, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 354 days.

(21) Appl. No.: 16/883,534

(22) Filed: May 26, 2020

(65) Prior Publication Data
US 2021/0368883 A1 Dec. 2, 2021

(51) Int. Cl.
*A41D 13/11* (2006.01)
*B32B 7/08* (2019.01)
(Continued)

(52) U.S. Cl.
CPC ............ *A41D 13/1184* (2013.01); *B32B 7/08* (2013.01); *B26F 1/14* (2013.01); *B32B 27/065* (2013.01);
(Continued)

(58) Field of Classification Search
CPC ............ A41D 13/1184; A41D 13/1161; A41D 13/1153; A41D 13/1192; A41D 31/04;
(Continued)

(56) References Cited

U.S. PATENT DOCUMENTS 2,249,105 A * 7/1941 Aspenleiter .................... 2/445
2,262,449 A * 11/1941 Buegeleisen ........... A61F 9/025
 2/9

(Continued)

FOREIGN PATENT DOCUMENTS

CA 2386043 11/2003
CA 2572727 2/2006
(Continued)

OTHER PUBLICATIONS

Multilayered, (n.d.) American Heritage® Dictionary of the English Language, Fifth Edition. (2011). Retrieved Dec. 14, 2022 from https://www.thefreedictionary.com/multilayered (Year: 2011).*

*Primary Examiner* — Robert H Muromoto, Jr.
(74) *Attorney, Agent, or Firm* — Vichit Chea; Carlson, Gaskey & Olds, P.C.

(57) ABSTRACT

A face shield manufacturing method includes, among other things, positioning a bumper layer between a headband layer and a shield layer. The method further includes securing the bumper layer, the shield layer, and headband layer to provide a multilayered structure, and cutting a face shield assembly from the multilayered structure. A face shield assembly includes, among other things, a bumper configured to be placed against a front of a head of a user, a shield secured to the bumper, a headband configured to be placed against a rear of the head of the user, and fasteners. Each of the fasteners binds an end portion of the headband to at least the bumper. The headband is folded over each fastener when the bumper is placed against the front of the head of the user and the headband is placed against a back of the head of the user.

19 Claims, 4 Drawing Sheets

(51) Int. Cl.
*A41D 27/00* (2006.01)
*F16B 15/00* (2006.01)
*B32B 27/08* (2006.01)
*B32B 27/06* (2006.01)
*B26F 1/14* (2006.01)

(52) U.S. Cl.
CPC ........... *B32B 27/08* (2013.01); *B32B 2535/00* (2013.01); *B32B 2571/00* (2013.01); *F16B 15/0015* (2013.01)

(58) Field of Classification Search
CPC .......... A41D 31/18; A41D 31/30; B32B 7/08; B32B 27/065; B32B 27/08; B32B 2535/00; B32B 2571/00; B32B 2266/08; B32B 2307/412; B32B 3/263; B32B 5/022; B32B 2307/51; B32B 3/08; B32B 5/02; B32B 5/18; B32B 5/245; B32B 5/32; B32B 7/12; B32B 27/36; B26F 1/14; F16B 15/0015
See application file for complete search history.

(56) References Cited

U.S. PATENT DOCUMENTS

| | | | |
|---|---|---|---|
| 5,020,533 A * | 6/1991 | Hubbard | A41D 13/1115 2/427 |
| 5,543,010 A * | 8/1996 | Keng | B32B 27/10 283/901 |
| 5,730,644 A * | 3/1998 | Pfanstiehl | A46B 11/001 206/229 |
| 6,301,719 B1 | 10/2001 | Goodhand et al. | |
| 6,370,695 B2 | 4/2002 | Paris et al. | |
| 6,564,804 B2 | 5/2003 | Salatka et al. | |
| 6,854,128 B1 | 2/2005 | Faulk | |
| 6,990,981 B2 | 1/2006 | DuBois et al. | |
| 7,007,306 B2 | 3/2006 | Howard et al. | |
| D526,446 S | 8/2006 | Cowan et al. | |
| D533,316 S | 12/2006 | Canavan et al. | |
| 7,178,931 B1 | 2/2007 | Murphy | |
| D539,987 S | 4/2007 | Love | |
| D544,679 S | 6/2007 | Almeida | |
| D563,603 S | 3/2008 | Huh et al. | |
| 7,389,543 B2 | 6/2008 | Reichow et al. | |
| 7,406,964 B2 | 8/2008 | Diaz | |
| 7,418,740 B2 | 9/2008 | Anderson et al. | |
| 7,490,359 B2 | 2/2009 | Landis | |
| 7,520,630 B2 | 4/2009 | Murphy | |
| D598,610 S | 8/2009 | Soukup et al. | |
| D615,119 S | 5/2010 | Palmer et al. | |
| 7,725,949 B2 | 6/2010 | Landis | |
| 7,735,156 B2 | 6/2010 | VanDerWoude et al. | |
| 7,752,682 B2 | 7/2010 | VanDerWoude et al. | |
| 7,774,858 B2 | 8/2010 | Kayerod | |
| 7,814,578 B2 | 10/2010 | Kosel et al. | |
| 7,850,303 B2 | 12/2010 | Reichow et al. | |
| D638,169 S | 5/2011 | Lebel et al. | |
| 7,937,775 B2 | 5/2011 | Manzella, Jr. et al. | |
| D645,211 S | 9/2011 | Hill | |
| 8,020,552 B2 | 9/2011 | Dillon et al. | |
| 8,070,288 B2 | 12/2011 | Heyman et al. | |
| D652,574 S | 1/2012 | Stoll | |
| 8,104,891 B2 | 1/2012 | Reichow et al. | |
| 8,166,575 B2 | 5/2012 | Haselmayer | |
| 8,185,969 B2 | 5/2012 | Chang | |
| D662,672 S | 6/2012 | Carlborg et al. | |
| 8,196,224 B2 | 6/2012 | Manzella, Jr. et al. | |
| 8,225,421 B1 | 7/2012 | Froissard | |
| 8,234,722 B2 | 8/2012 | VanDerWoude et al. | |
| 8,272,070 B2 | 9/2012 | Brown et al. | |
| 8,282,234 B2 | 10/2012 | VanDerWoude et al. | |
| 8,291,512 B2 | 10/2012 | Stoll | |
| 8,336,123 B2 | 12/2012 | Gleason et al. | |
| 8,359,662 B2 | 1/2013 | Viljanen | |
| 8,375,474 B2 | 2/2013 | Arai | |
| 8,387,163 B2 | 3/2013 | Beliveau | |
| D681,282 S | 4/2013 | Dente | |
| 8,407,818 B2 | 4/2013 | VanDerWoude et al. | |
| 8,434,167 B2 | 5/2013 | Gleason et al. | |
| 8,434,168 B2 | 5/2013 | Paulson | |
| D684,321 S | 6/2013 | Gill | |
| 8,458,812 B2 | 6/2013 | Kayerod | |
| 8,458,813 B2 | 6/2013 | Grad et al. | |
| 8,564,503 B2 | 10/2013 | Righi et al. | |
| 8,677,517 B1 | 3/2014 | Morency et al. | |
| 8,678,582 B2 | 3/2014 | Reichow et al. | |
| 8,875,318 B2 | 11/2014 | Huh | |
| 8,899,867 B2 | 12/2014 | Tatomir | |
| D720,891 S | 1/2015 | Gill | |
| 8,955,168 B2 | 2/2015 | Manzella, Jr. et al. | |
| D726,378 S | 4/2015 | Wako | |
| 9,004,801 B2 | 4/2015 | Tatomir | |
| D730,584 S | 5/2015 | Paulson | |
| D732,242 S | 6/2015 | Miller et al. | |
| D734,538 S | 7/2015 | Sybydlo et al. | |
| 9,277,780 B2 | 3/2016 | Hillion | |
| D759,900 S | 6/2016 | Cummings et al. | |
| 9,408,429 B2 | 8/2016 | Tatomir | |
| 9,427,288 B1 | 8/2016 | Chenger et al. | |
| 9,532,617 B2 | 1/2017 | Miller et al. | |
| 9,681,698 B2 | 6/2017 | Tatomir | |
| 9,700,093 B2 | 7/2017 | Gamache et al. | |
| 9,855,171 B2 | 1/2018 | York | |
| 9,894,952 B2 | 2/2018 | Hayes | |
| 9,895,592 B2 | 2/2018 | Emard | |
| 9,949,517 B2 | 4/2018 | Howard | |
| 9,980,529 B1 | 5/2018 | Hajianpour | |
| 10,022,273 B2 | 7/2018 | Huh | |
| 10,052,233 B2 | 8/2018 | Yang et al. | |
| D829,384 S | 9/2018 | Paulson | |
| 10,076,149 B2 | 9/2018 | Ross et al. | |
| 10,098,403 B2 | 10/2018 | Sommers et al. | |
| D834,756 S | 11/2018 | Paulson | |
| 10,136,693 B1 | 11/2018 | Paulson | |
| 10,231,495 B2 | 3/2019 | Nabai | |
| 10,286,287 B2 | 5/2019 | King | |
| 10,307,217 B2 | 6/2019 | Sparkuhl | |
| D853,656 S | 7/2019 | Martin et al. | |
| 10,357,401 B2 | 7/2019 | Hsu et al. | |
| 10,384,084 B2 | 8/2019 | Isham et al. | |
| 10,398,601 B2 | 9/2019 | Cornelius et al. | |
| 10,420,386 B1 | 9/2019 | Jefferis et al. | |
| 10,449,397 B2 | 10/2019 | VanDerWoude et al. | |
| D869,096 S | 12/2019 | Langlois et al. | |
| D876,020 S | 2/2020 | Langlois et al. | |
| D879,383 S | 3/2020 | Bowen | |
| 10,603,217 B2 | 3/2020 | Spier | |
| 2003/0189078 A1* | 10/2003 | Franks | B65C 7/003 227/107 |
| 2005/0015860 A1* | 1/2005 | Reaux | A61F 9/064 2/424 |
| 2008/0249779 A1 | 10/2008 | Hennecke | |
| 2008/0263326 A1 | 10/2008 | Rasche et al. | |
| 2012/0266418 A1* | 10/2012 | Chou | A63B 33/004 24/191 |
| 2015/0223548 A1 | 8/2015 | Okuma et al. | |
| 2016/0331059 A1 | 11/2016 | Basson et al. | |
| 2017/0000207 A1 | 1/2017 | Hajianpour | |
| 2017/0042274 A1 | 2/2017 | Tatomir | |
| 2017/0079364 A1 | 3/2017 | Paulson | |
| 2017/0370330 A1* | 12/2017 | Bartolotta | F02M 26/48 |
| 2018/0042311 A1 | 2/2018 | Carraro | |
| 2018/0084848 A1 | 3/2018 | Pavalarajan et al. | |
| 2018/0228652 A1 | 8/2018 | Ohura | |
| 2018/0343938 A1 | 12/2018 | Koros et al. | |
| 2018/0368505 A1 | 12/2018 | Kidman et al. | |
| 2019/0133238 A1 | 5/2019 | Tsai | |
| 2019/0174860 A1 | 6/2019 | VanderWoude et al. | |
| 2019/0175410 A1 | 6/2019 | Eliseo | |
| 2019/0209912 A1* | 7/2019 | Isserow | A42B 3/18 |
| 2019/0231005 A1 | 8/2019 | Jefferis et al. | |
| 2019/0274885 A1 | 9/2019 | Huh | |
| 2019/0350294 A1 | 11/2019 | Paiz | |

(56) References Cited

U.S. PATENT DOCUMENTS

2020/0001123 A1    1/2020  VenDerWoude et al.
2020/0068980 A1    3/2020  Langlois et al.
2021/0368883 A1*  12/2021  Stephens ................... B32B 5/32

FOREIGN PATENT DOCUMENTS

| CA | 2602821 | 9/2006 |
| CA | 2845907 | 9/2006 |
| CA | 2615192 | 1/2007 |
| CA | 2812712 | 1/2007 |
| CA | 2678070 | 9/2008 |
| CA | 133964  | 9/2010 |
| CA | 137375  | 4/2011 |
| CA | 135263  | 10/2011 |
| CA | 135264  | 10/2011 |
| CA | 139823  | 11/2011 |
| CA | 2770226 | 9/2012 |
| CA | 2776493 | 11/2012 |
| CA | 2802381 | 7/2013 |
| CA | 2870148 | 11/2013 |
| CA | 158101  | 7/2015 |
| CA | 2852446 | 11/2015 |
| CA | 183212  | 5/2019 |
| CA | 183213  | 5/2019 |

\* cited by examiner

FACE SHIELD MANUFACTURING METHOD AND ASSEMBLY

TECHNICAL FIELD

This disclosure relates generally to face shields and, more particularly, to the manufacturing of face shields.

BACKGROUND

A face shield is a type of personal protective equipment (PPE). A user can wear a face shield to protect their face and associated mucous membranes (e.g., eye, nose, and mouth membranes) from, for example, a spray, splash, or spatter of bodily fluids. A face shield can instead or additionally protect the user from other things, such as airborne debris or chemical splashes.

SUMMARY

A face shield manufacturing method accordingly to an exemplary aspect of the present disclosure includes, among other things, positioning a bumper layer between a headband layer and a shield layer. The method further includes securing together the bumper layer, the shield layer, and headband layer to provide a multilayered structure, and then cutting a face shield assembly from the multilayered structure.

Another example of the foregoing method includes, during the securing, adhesively attaching the bumper layer to the shield layer.

Another example of the foregoing method includes, during the securing and prior to the cutting, binding the headband layer to at least the bumper layer using a fastener.

In another example of any of the foregoing methods, the fastener is an elastic staple.

In another example of any of the foregoing methods, the fastener includes a body portion that extends longitudinally, a first enlarged portion disposed at a first longitudinal end of the body portion, and a second enlarged portion disposed at an opposite, second longitudinal end of the body portion. After the securing, the first and second enlarged portions are positioned adjacent an outer surface of the shield layer, and the body portion extends through the headband layer, the bumper layer, and the shield layer.

In another example of any of the foregoing methods, after the securing, the body portion of the fastener is curved such that the body portion extends from the first enlarged head on a first side of the multilayered structure to an opposite, second side of the multilayered structure, and extends from the second side of the multilayered structure back to the second enlarged head on the first side of the multilayered structure.

In another example of any of the foregoing methods, the fastener is a first fastener, and the method includes, during the securing and prior to the cutting, binding the headband layer to at least bumper layer using a second fastener. The first fastener is spaced a distance from the second fastener after the securing such that, when the face shield assembly is worn by a user, the first fastener is positioned adjacent a first temple on a first side of a head of the user, and the second fastener is positioned adjacent a second temple on an opposite second side of the head of the user.

In another example of any of the foregoing methods, when the face shield assembly is worn by the user, the bumper layer of the face shield assembly is positioned against a forehead of the user, and the headband layer of the face shield assembly is positioned against a rear of the head of the user.

In another example of any of the foregoing methods, the face shield assembly is configured such that the headband layer of the face shield assembly is folded over portions of the first and second fasteners when the face shield assembly is worn by the user.

In another example of any of the foregoing methods, the headband layer is an elastic headband layer, and the bumper layer is a foam bumper layer.

In another example of any of the foregoing methods, the cutting comprises die cutting through the bumper layer, the headband layer, and the shield layer.

Another example of any of the foregoing methods includes, prior to the positioning, unrolling the headband layer from a roll of headband layer material, and unrolling the bumper layer from a roll of bumper layer material.

Another example of any of the foregoing methods includes, prior to the positioning, unrolling the shield layer from a roll of shield layer material.

In another example of any of the foregoing methods, the positioning includes positioning the bumper layer as a first bumper layer and the headband layer as a first headband layer along a first lateral edge of the shield layer. The positioning further includes positioning a second bumper layer between a second headband layer and the shield layer along an opposing, second lateral edge of the shield layer.

In another example of any of the foregoing methods, the cutting comprises cutting a first shield assembly from a first lateral side of the multilayered structure, and simultaneously cutting a second shield assembly from a second lateral side of the multilayered structure.

Another example of any of the foregoing methods includes positioning a label on an outer surface of the shield layer.

Another example of any of the foregoing methods includes a face shield assembly manufactured according to the manufacturing method.

A face shield assembly according to another exemplary aspect of the present disclosure includes, among other things, a bumper configured to be placed against a front of a head of a user, a shield secured to the bumper, a headband configured to be placed against a rear of the head of the user, and fasteners. Each of the fasteners binds a portion of the headband to at least the bumper. The headband is folded over portions of the fasteners when the bumper is placed against the front of the head of the user and the headband is placed against a back of the head of the user.

In another example of the foregoing assembly, the fasteners are elastic staples.

In another example of any of the foregoing assemblies, each of the fasteners pierces the bumper to directly bind the portion of the headband to the bumper.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a face shield assembly and a face shield manufacturing method. The method can combine layers of materials into a multilayered structure, which is then cut to provide a face shield assembly. The method can reduce costs and assembly time when compared to face shields that are assembled by hand from precut components.

Figure 1:
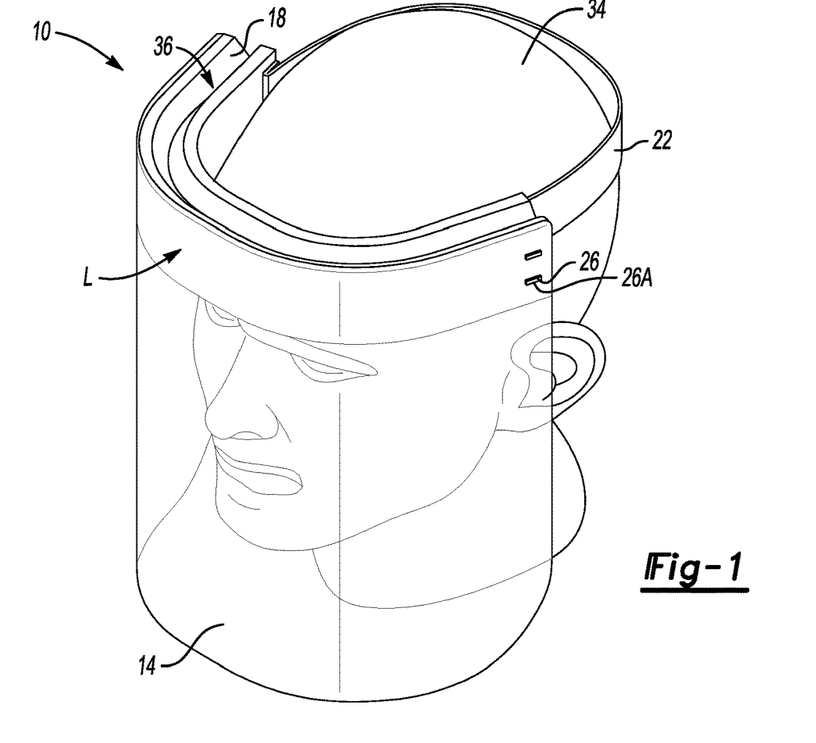
FIG. 1 illustrates a perspective view of a user wearing a face shield assembly according to an exemplary aspect of the present disclosure.
Figure 2:
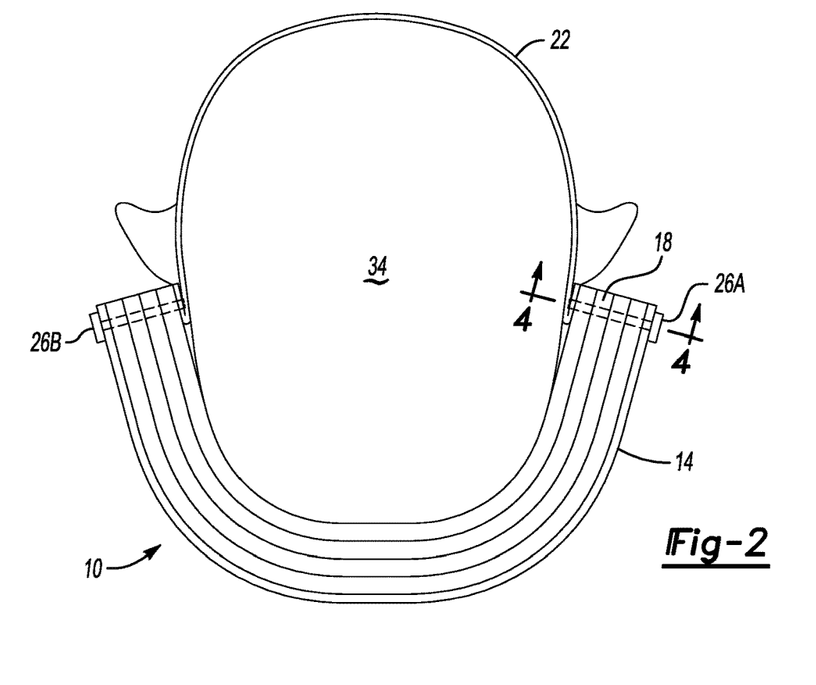
FIG. 2 illustrates a top view of the user wearing the face shield assembly of FIG. 1.

With reference to FIGS. 1 and 2, a face shield assembly 10 according to an exemplary embodiment of the present disclosure includes a shield 14, a bumper 18, a headband 22, and at least one fastener 26. A user 30 can place the face shield assembly 10 on their head 34 to protect the user 30 from, for example, a spray of bodily fluids expelled from another person.

When the user 30 wears the face shield assembly 10, the bumper 18 is placed against their forehead along a front of the head 34, and the headband 22 is placed against a back of the head 34. When worn, the shield 14 and bumper 18 curve into an arced profile as shown in the overhead view of FIG. 2 and the headband 22 stretches about the back of the head 34.

The shield 14 can be a transparent or semi-transparent polymer or polymer-based material that is antimicrobial. In a specific example, the shield 14 is a polyethylene terephthalate (PET), which can be cleaned and is relatively strong and lightweight. The user 30 can look through the shield 14 when the user 30 is wearing the face shield assembly 10.

The bumper 18 can be an antimicrobial foam material, such as an antimicrobial closed cell foam. Using closed cell foam rather than, for example, an open cell foam, can facilitate cleanability. The bumper 18 can include grooves 36 and other features to help the bumper 18 conform to a profile of the head 34 when the user 30 is wearing the face shield assembly 10. Conforming the bumper 18 to the profile of the head 34 can help to avoid gaps between the head 34 and the bumper 18, which could be potential paths for spray and contaminates to move near the face of the user 30.

The headband 22 can be an antimicrobial elastic material that stretches as the user 30 places the face shield assembly 10 on their head 34. The elastic material can help to hold the face shield assembly 10 on the head 34 of the user 30 and can enable the face shield assembly 10 to adjust to a size of the head 34. The headband 22 could, in another example, be a felt material, a fabric material, or another type of material.

The at least one fastener 26 can bind the headband 22 to the bumper 18. In this example, the face shield assembly 10 includes a first fastener 26A and a second fastener 26B. When the user is wearing the face shield assembly 10, the first fastener 26A is disposed adjacent a left temple of the head 34. The second fastener 26B is spaced a distance from the first fastener 26A and is disposed adjacent a right temple of the head 34.

Figure 3:
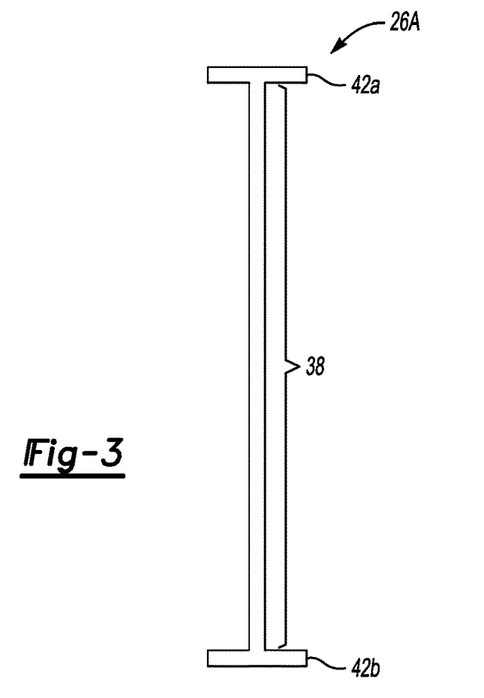
FIG. 3 illustrates a fastener used in the face shield of FIG. 1.
Figure 4:
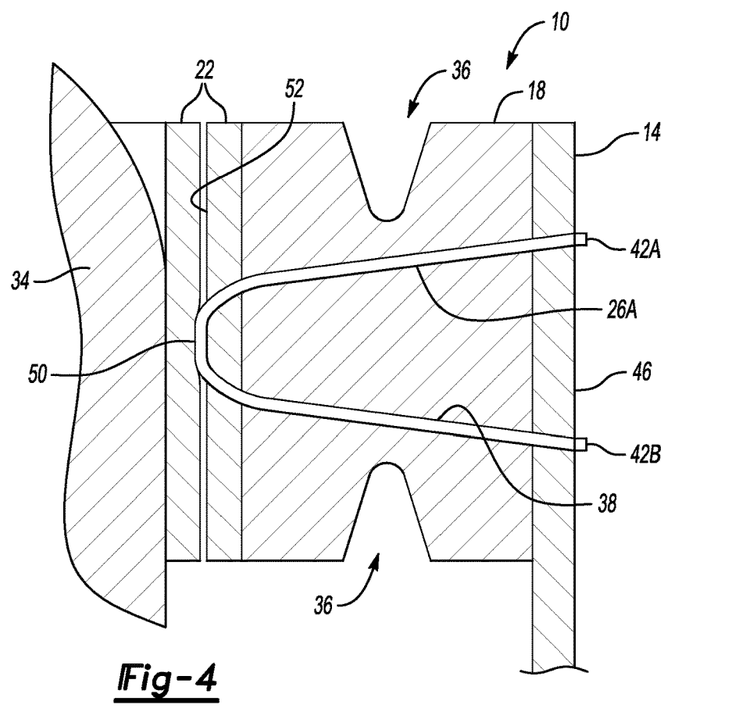
FIG. 4 illustrates a section view taken at line 4-4 in FIG. 2.
Figure 5:
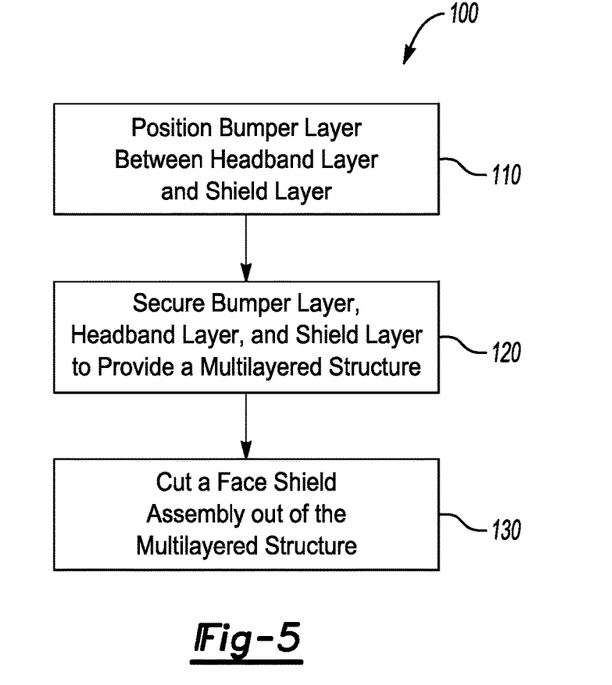
FIG. 5 illustrates a flow of a face shield manufacturing method according to another exemplary aspect of the present disclosure.
Figure 6:
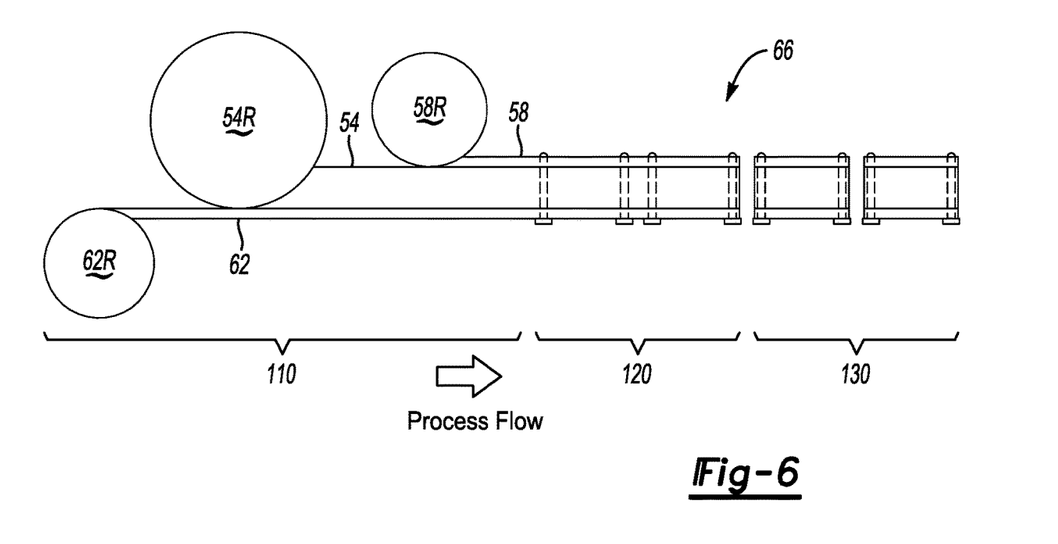
FIG. 6 illustrates a schematic view of layers being positioned, secured, and cut according to the method of FIG. 5.

With reference to FIGS. 3 and 4 and continued reference to FIGS. 1 and 2, in the exemplary embodiment, the first fastener 26A includes a body portion 38 that extends longitudinally from a first enlarged portion 42A to a second enlarged portion 42B. The first fastener 26A is an elastic staple in the exemplary embodiment.

When the first fastener 26A is binding the headband 22 to the bumper 18, the first fastener 26A is curved into a U shape as shown in FIG. 4. In particular, when binding the headband 22 to the bumper 18, the first enlarged portion 42A is placed against an outer surface of the shield 14 on a first, outer side 46 of the face shield assembly 10. The body portion 38 extends from the first enlarged portion 42A through the shield 14, the bumper 18, and the headband 22 to an exposed section 50 of body portion 38. The exposed section 50 is placed against a surface of the headband 22 on a second, inner side 52 of the face shield assembly 10 opposite the first side 46.

From the exposed section 50, the body portion 38 then loops back through the headband 22, the bumper 18, and the shield 14 to the second enlarged portion 42B, which is placed against the surface of the shield 14 on the first side 46 of the face shield assembly 10. The first enlarged portion 42A and second enlarged portion 42B prevent the body portion 38 from withdrawing into the shield 14.

Notably, when the user is wearing the face shield assembly 10 as shown in FIGS. 1 and 2, the headband 22 is folded over the exposed section 50 of the body portion 38. This can prevent the exposed section 50 from contacting the left temple area of the head 34 and irritating the user 30.

In another example, the orientation of the first fastener 26A could be changed such that the first enlarged portion 42A and the second enlarged portion 42B are placed against the second side 52 of the face shield assembly 10, and the exposed section 50 is placed against the first side 46 of the face shield assembly 10. The first fastener 26A could instead extend through, for example, only the bumper 18 and the headband 22 (i.e., not entirely through the face shield assembly 10).

The second fastener 26B can be configured similarly to the first fastener 26A, but disposed on a right side of the head 34 of the user 30 when the face shield assembly 10 is worn. The headband 22 folds over and exposed portion of the second fastener 26B when the face shield assembly 10 is worn.

The first fastener 26A is spaced a distance from the second fastener 26B such that, when the face shield assembly is worn, the first fastener 26A is positioned adjacent the left temple area of the head 34 and the second fastener 26B is positioned adjacent a right temple area of the head 34 on an opposite second side of the head 34.

With reference now the FIGS. 5-8, a flow of an example face shield manufacturing method 100 begins at a step 110 where a bumper layer 54 is positioned between a headband layer 58 and a shield layer 62. Next at a step 120, the method 100 secures or joins together the bumper layer 54, the headband layer 58 and the shield layer 62 to provide a multilayered structure 66. At a step 130, at least one face shield assembly 10A, 10B is cut out of the multilayered structure 66.

During the step 110 of the exemplary method 100, the bumper layer 54 can be unrolled from a roll 54R of bumper layer material, the headband layer 58 can be unrolled from a roll 58R of headband layer material, and the shield layer 62 can be unrolled from a roll 62R of shield layer material. Rollers 64 (FIG. 8) can be rotated to pull the material from the respective rolls 54R, 58R, and 62R. In other examples, one or more of the bumper layer material, the headband layer material, or the shield layer material is not provided on rolls.

The step 120, in this example, includes securing the shield layer 62 to the bumper layer 54 using an adhesive, such as glue. The adhesive can be applied between the shield layer 62 and the bumper layer 54 just after the shield layer 62 is unrolled from the roll 62R and the bumper layer 54 is unrolled from the roll 54R. In a specific example, an adhesive is provided as a layer of adhesive that is part of the bumper layer material within the roll 54R of bumper layer material. The bumper layer material within the roll 54R could further include a film layer covering the adhesive layer. The film layer prevents the adhesive from sticking together the bumper layer material within the roll 54R. As the bumper layer material is unrolled, and prior to the bumper layer 54 contacting the shield layer 62, the film layer is peeled away to expose the adhesive layer. The exposed adhesive layer can then secure the bumper layer 54 to the shield layer 62 as the bumper layer 54 is positioned between the headband layer 58 and the shield layer 62. In another example, the adhesive layer could be provided as a layer of adhesive that is part of the shield layer 62.

In addition to the securing using adhesive, the step 120 further includes the binding of the headband layer 58 to the shield layer 62 and the bumper layer 54 using a plurality of fasteners, here elastic staples 70 that are unrolled from respective spools 70R of elastic staples 70. An elastic stapling machine 74 can be used to drive individual elastic staples 70 into a position where the elastic staples 70 bind the headband layer 58 to the shield layer 62 and the bumper layer 54. Other fasteners, such as rivets, could be used in other examples.

After the step 120, the bumper layer 54, the headband layer 58, and the shield layer 62 are secured together as the multilayered structure 66. In the exemplary embodiment, the multilayered structure 66 is fed into a cutting machine, here a die cutter 84, which performs the step 130 of the method 100 by cutting a face shield assembly 10A from the multilayered structure 66. The cutting machine, in another example, could be something other than the die cutter 84—a water jet cutting machine, for example.

Notably, in the exemplary embodiment, the cutting is through each of the bumper layer 54, the headband layer 58, and the shield layer 62 of the multilayered structure 66. That is, the bumper layer 54, the headband layer 58, and the shield layer 62 are all cut by the die cutter 84, which could be a two-stage progressive die. In other examples, the die cutter 84 is a single stage die, or a three-stage progressive die.

The multilayered structure 66 can be continuously fed into the die cutter 84 facilitating a continuous and relatively rapid manufacturing of face shield assemblies. In some examples, the method is substantially automated throughout and can provide an increased throughput of face shield assemblies when compared to hand assembly processes. After the cutting, the face shield assembly 10A does not, in this example, require substantial additional processing and is suitable for use.

In some examples, a label layer could be secured to the outer surface of the shield layer 62 in an area L (FIG. 1), for example. The label layer can help to hide some or all of the bumper layer 54 from view. The label could include text, symbols, characters, colors, etc. In some examples a label layer could be positioned between the shield layer 62 and the bumper layer 54 during the positioning. The label layer can include text, symbols, characters, colors, etc., which are then visible through the shield layer 62 in the area L, for example. In still other examples, other layers could be added into the multilayered structure 66. For example, the bumper layer 54 could include two separate layers of foam, one with markings that are visible through the shield layer 62 in the area L.

Figure 7:
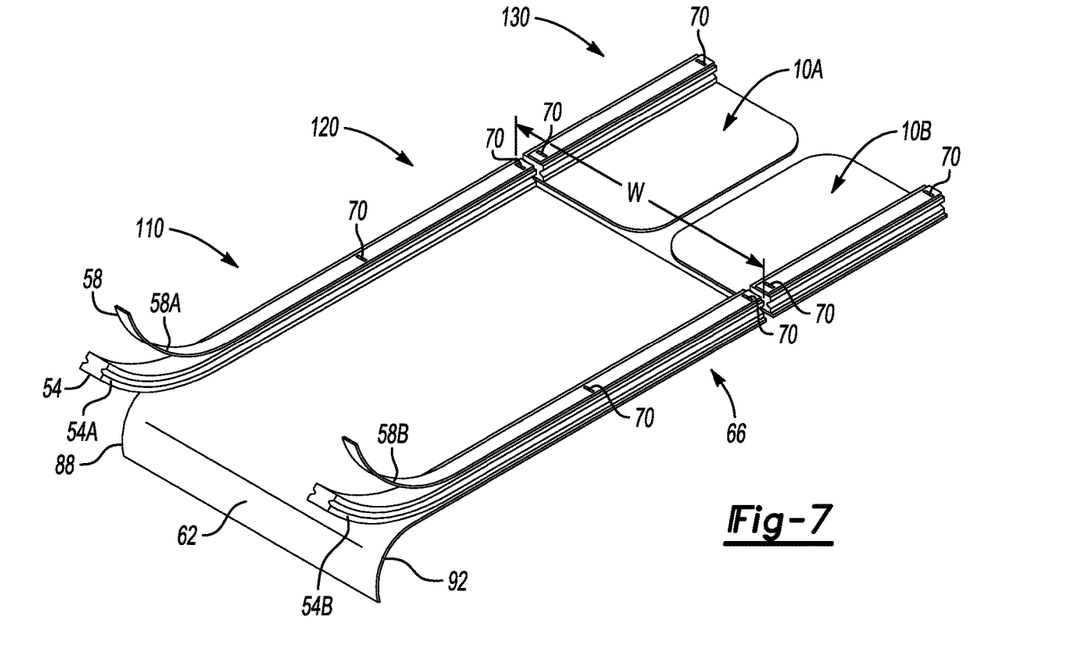
FIG. 7 illustrates a perspective view of layers being positioned, secured, and cut according to the method of FIG. 5.
Figure 8:
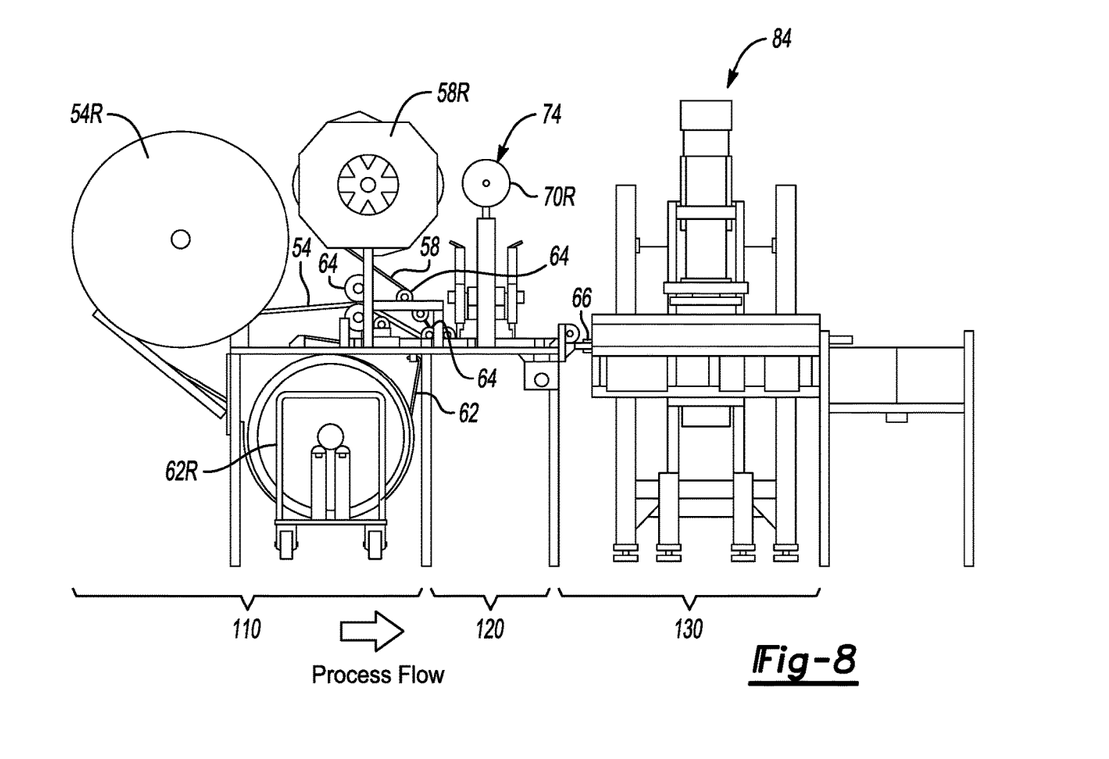
FIG. 8 illustrates a side view of equipment manufacturing face shield assemblies according to the method of FIG. 5.

With reference to FIG. 7, the positioning, in the exemplary embodiment, includes positioning a first bumper layer 54A between a first headband layer 58A and the shield layer 62 along a first lateral edge 88 of the shield layer 62. The positioning further includes positioning a second bumper layer 54B between a second headband layer 58B and the shield layer 62 along an opposing, second lateral edge 92 of the shield layer 62.

The cutting then includes simultaneously cutting the first shield assembly 10A from a first lateral side of the multilayered structure 66 and the second face shield assembly 10B from a second lateral side of the multilayered structure 66. That is, more than one face shield assembly, here two, can be provided across a width W of the multilayered structure 66. In other examples, the width W is increased and other bumper layers and headband layers are added such that the width of the multilayered structure can provide more than two face shield assemblies.

Features of the disclosed embodiments can include a face shield manufacturing method that facilitates automation, reduces costs associated with face shield manufacturing, and increases a speed at which face shield assemblies can be produced.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A face shield manufacturing method, comprising:
    positioning a bumper layer between a headband layer and a shield layer;
    securing the bumper layer, the shield layer, and headband layer to provide a multilayered structure; and
    cutting a face shield assembly from the multilayered structure,
        wherein the cutting comprises die cutting through the bumper layer, the headband layer, and the shield layer.

2. The face shield manufacturing method of claim 1, further comprising, during the securing, adhesively attaching the bumper layer to the shield layer.

3. The face shield manufacturing method of claim 1, further comprising, during the securing and prior to the cutting, binding the headband layer to at least the bumper layer using a fastener.

4. The face shield manufacturing method of claim 3, wherein the fastener is an elastic staple.

5. The face shield manufacturing method of claim 3, wherein fastener includes a body portion that extends longitudinally, a first enlarged portion disposed at a first longitudinal end of the body portion, and a second enlarged portion disposed at an opposite, second longitudinal end of the body portion,
wherein, after the securing, the first and second enlarged portions are positioned adjacent an outer surface of the shield layer, and the body portion extends through the headband layer, the bumper layer, and the shield layer.

6. The face shield manufacturing method of claim 5, wherein, after the securing, the body portion of the fastener is curved such that the body portion extends from the first enlarged portion on a first side of the multilayered structure to an opposite, second side of the multilayered structure, and extends from the second side of the multilayered structure back to the second enlarged portion on the first side of the multilayered structure.

7. The face shield manufacturing method of claim 3, wherein the fastener is a first fastener, and further comprising, during the securing and prior to the cutting, binding the headband layer to at least bumper layer using a second fastener, the first fastener spaced a distance from the second fastener after the securing such that, when the face shield assembly is worn by a user, the first fastener is positioned adjacent a first temple on a first side of a head of the user, and the second fastener is positioned adjacent a second temple on an opposite second side of the head of the user.

8. The face shield manufacturing method of claim 7, wherein, when the face shield assembly is worn by the user, the bumper layer of the face shield assembly is positioned against a forehead of the user, and the headband layer of the face shield assembly is positioned against a rear of the head of the user.

9. The face shield manufacturing method of claim 8, wherein the face shield assembly is configured such that the headband layer of the face shield assembly is folded over portions of the first and second fasteners when the face shield assembly is worn by the user.

10. The face shield manufacturing method of claim 1, wherein the headband layer is an elastic headband layer, and the bumper layer is a foam bumper layer.

11. A face shield manufacturing method, comprising:
positioning a bumper layer between a headband layer and a shield layer;
securing the bumper layer, the shield layer, and headband layer to provide a multilayered structure;
cutting a face shield assembly from the multilayered structure; and
prior to the positioning, unrolling the headband layer from a roll of headband layer material, and unrolling the bumper layer from a roll of bumper layer material.

12. The face shield manufacturing method of claim 11, further comprising, prior to the positioning, unrolling the shield layer from a roll of shield layer material.

13. The face shield manufacturing method of claim 1, wherein the positioning comprises positioning the bumper layer as a first bumper layer and the headband layer as a first headband layer along a first lateral edge of the shield layer, wherein the positioning further comprises positioning a second bumper layer between a second headband layer and the shield layer along an opposing, second lateral edge of the shield layer.

14. The face shield manufacturing method of claim 13, wherein the cutting comprises cutting a first shield assembly from a first lateral side of the multilayered structure, and simultaneously cutting a second shield assembly from a second lateral side of the multilayered structure.

15. The face shield manufacturing method of claim 1, further comprising positioning a label on an outer surface of the shield layer.

16. A face shield assembly manufactured according to the manufacturing method of claim 1.

17. A face shield assembly, comprising:
a bumper configured to be placed against a front of a head of a user;
a shield secured to the bumper;
a headband configured to be placed against a rear of the head of the user; and
a plurality of fasteners, each fastener within the plurality of fasteners binding a portion of the headband to at least the bumper, wherein the headband is folded over a portion of each fastener within the plurality of fasteners when the bumper is placed against the front of the head of the user and the headband is placed against a back of the head of the user,
wherein the face shield assembly is cut from a multilayered structure, the multilayered structure provided by a bumper layer secured to a headband layer and a shield layer with the bumper layer between the headband layer and the shield layer.

18. The face shield assembly of claim 17, wherein the plurality of fasteners are elastic staples.

19. The face shield assembly of claim 17, wherein each fastener within the plurality of fasteners pierces the bumper to directly bind the portion of the headband to the bumper.

* * * * *